(12) United States Patent
Subramaniam et al.

(10) Patent No.: US 11,545,027 B2
(45) Date of Patent: Jan. 3, 2023

(54) MODULES WITH COMMUNICATION INTERFACES

(71) Applicant: Hewlett-Packard Development Company, L.P., Spring, TX (US)

(72) Inventors: Ravi Shankar Subramaniam, Palo Alto, CA (US); Richard Edward Hodges, Spring, TX (US); Charles J. Stancil, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/265,562

(22) PCT Filed: Nov. 14, 2018

(86) PCT No.: PCT/US2018/060928
§ 371 (c)(1),
(2) Date: Feb. 3, 2021

(87) PCT Pub. No.: WO2020/101662
PCT Pub. Date: May 22, 2020

(65) Prior Publication Data
US 2021/0264771 A1 Aug. 26, 2021

(51) Int. Cl.
*G08C 17/02* (2006.01)
*H04W 12/037* (2021.01)
*G06F 13/40* (2006.01)

(52) U.S. Cl.
CPC ......... *G08C 17/02* (2013.01); *G06F 13/4095* (2013.01); *H04W 12/037* (2021.01); *G08C 2201/60* (2013.01)

(58) Field of Classification Search
CPC ............... G08C 17/02; G08C 2201/60; H04Q 2209/40; H04Q 9/00; H04L 69/18; H04L 67/10
See application file for complete search history.

(56) References Cited

U.S. PATENT DOCUMENTS

| 10,007,513 | B2 | 6/2018 | Malladi et al. | |
| 2006/0287008 | A1 | 12/2006 | Twitchell | |
| 2013/0132535 | A1 | 5/2013 | Basso et al. | |
| 2015/0066926 | A1* | 3/2015 | Dubois | G16H 20/30 707/756 |
| 2016/0330182 | A1 | 11/2016 | Jeon et al. | |
| 2017/0094716 | A1 | 3/2017 | Pogorelik et al. | |
| 2017/0099353 | A1 | 4/2017 | Arora et al. | |
| 2017/0134536 | A1* | 5/2017 | Tessiore | H04L 69/16 |
| 2017/0171204 | A1 | 6/2017 | Forood et al. | |
| 2017/0171607 | A1 | 6/2017 | Britt | |

(Continued)

FOREIGN PATENT DOCUMENTS

EP 2357569 A1 8/2011

*Primary Examiner* — Vernal U Brown
(74) *Attorney, Agent, or Firm* — Quarles & Brady LLP (57) ABSTRACT

An example module includes: a radio to communicate with a sensor; a communication interface to communicate with a second module; a chassis to mate with the second module; and a processor connected to the radio, the communication interface, and a memory, the processor to execute instructions stored in the memory. The instructions are to: receive, via the radio, sensor data from the sensor; process the sensor data to generate processed sensor data; and transmit the processed sensor data to a remote device.

14 Claims, 8 Drawing Sheets

(56) References Cited

U.S. PATENT DOCUMENTS

2017/0353542 A1    12/2017  Hammadou et al.
2018/0114140 A1     4/2018  Chen et al.
2019/0174072 A1*    6/2019  Tatem ................ H04N 21/6193

* cited by examiner

MODULES WITH COMMUNICATION INTERFACES

BACKGROUND

Edge devices that process sensor data received from internet of things sensors are generally dedicated devices that have fixed radio and processing functionality. However, as new sensors with new radio functionality and/or more complex sensing data are deployed, such edge devices become limited and/or must be replaced with new edge devices having updated radio and/or processing functionality.

BRIEF DESCRIPTION OF THE DRAWINGS

Reference will now be made, by way of example only, to the accompanying drawings in which.

DETAILED DESCRIPTION

Sensors, such as internet-of-things sensors, may be deployed in buildings, such as "smart" office buildings, to collect statistics and metrics on the building. These sensors may be connected wirelessly or wired to a central connectivity hub for the building and such a hub may transmit collected sensor data to a central aggregation point in the cloud and/or off-site from the building. Alternatively, dedicated edge devices are used to collect sensor data from the sensors and transmit the sensor data to the central connectivity hub. Either way, this may expose raw sensor data to the central connectivity hub which may cause issues with privacy, security, data overload and/or data retention policies. Furthermore, partitioning of the sensor data may be performed with meta-information on the building, which may require a thorough mapping of the location of each of the sensors in the building; as sensors move and/or new sensors are deployed, updating this mapping may be time consuming.

Furthermore, as the number and types of sensors, radio and computing devices continue to grow to address more complex sensing and data scenarios, new and flexible processes and devices for efficiently organizing and managing these sensors, radio and computing devices consistently and securely are desirable. In particular, configurable devices that provide flexible functionality are desirable.

Hence, provided herein is a module which includes a radio for communicating with sensors, such as internet-of-things sensors, and which may be conveniently mated and/or attached to a second module (e.g., which may or may not be similar to the module) and/or a computing device, to provide sensor connectivity functionality to the second module and/or the computing device. The module, either alone, or in combination with the second module and/or the computing device, may process sensor data received from the sensors to generate processed sensor data, which may be transmitted to a remote device for storage and/or further processing. The location of the module provides a convenient way for the remote device to implement a zoning scheme for sensors of a building in which the sensors and the module are located, without, for example, mapping the location of each of the sensors. The processed sensor data may be encrypted, watermarked, obfuscated, augmented, and the like, prior to transmitting to the remote device, which may provide privacy, security, sensor aggregation, data obfuscation, and the like, to reduce sensitive information leakage. Furthermore, the module may be provided in a stack configuration (e.g., to stack with the second module), a docking configuration (e.g., to dock with the second module and/or the computing device), a bar configuration (e.g., to attach to the second module and/or the computing device and/or an accessory of the computing device, such as a display device and the like), and the like.

Indeed, the mated modules may comprise an updated module and/or computing device with an enhanced set of capabilities such that the mated modules may have functionality that might not be performed when the modules are not mated. For example, one of the mated modules may include a temperature sensor and/or may be configured to communicate with a temperature sensor; and another of the mated modules may include a humidity sensor and/or may be configured to communicate with a humidity sensor. Hence, the mated modules may combine temperature sensor data and humidity sensor data into comfort sensor data. Hence, together, the mated modules have enhanced capabilities, and furthermore the mated modules may automatically discover and combine these capabilities when mated.

Furthermore, such mating may obviate devices with different abilities communicating via wiring pulled through walls, and the like. Furthermore, such enhanced capabilities provided through mating may include, but is not limited to: zoning based on the location of an "enhanced device" from mating; and combined computing power (e.g., to implement enhanced security functions from obfuscation, watermarking, and the like). Hence, the mated modules may be more than the sum of their parts via at least the combined capabilities and enhanced computing power.

Figure 1:
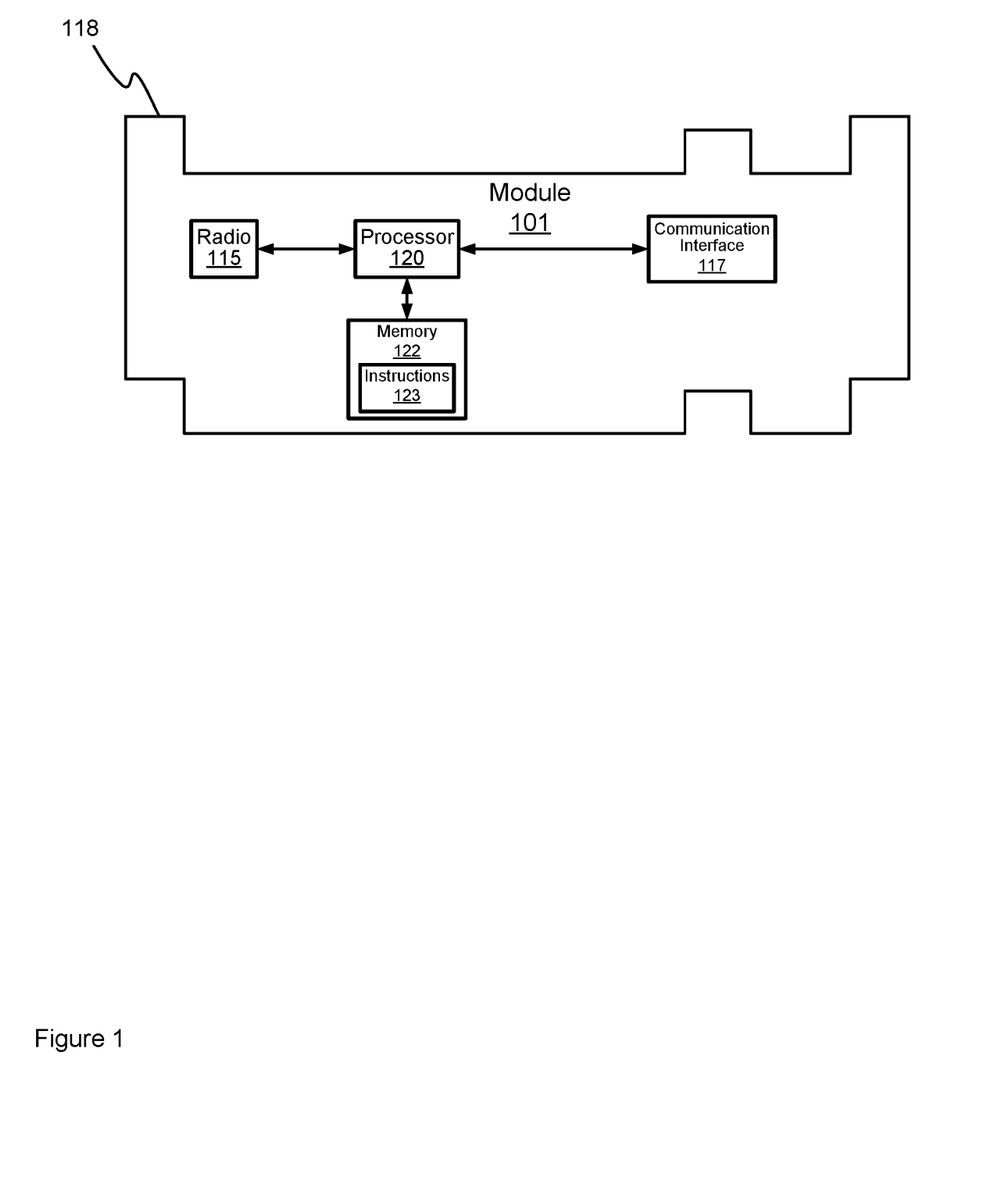
FIG. 1 is a block diagram of an example module that provides internet of things sensor connectivity to a computing device.
Figure 2:
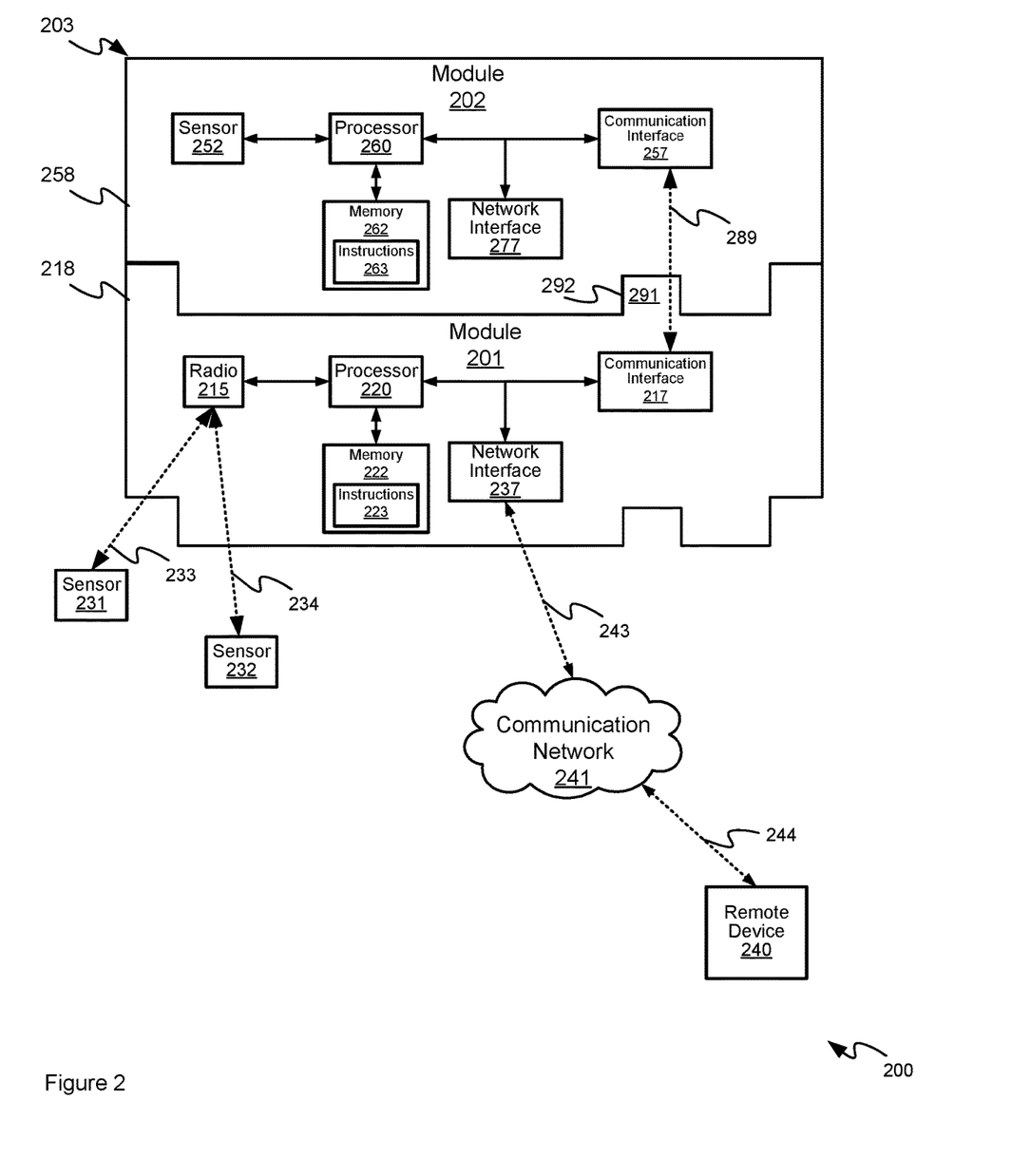
FIG. 2 is a block diagram of a system that includes an example module that provides internet of things sensor connectivity to a computing device.
Figure 3:
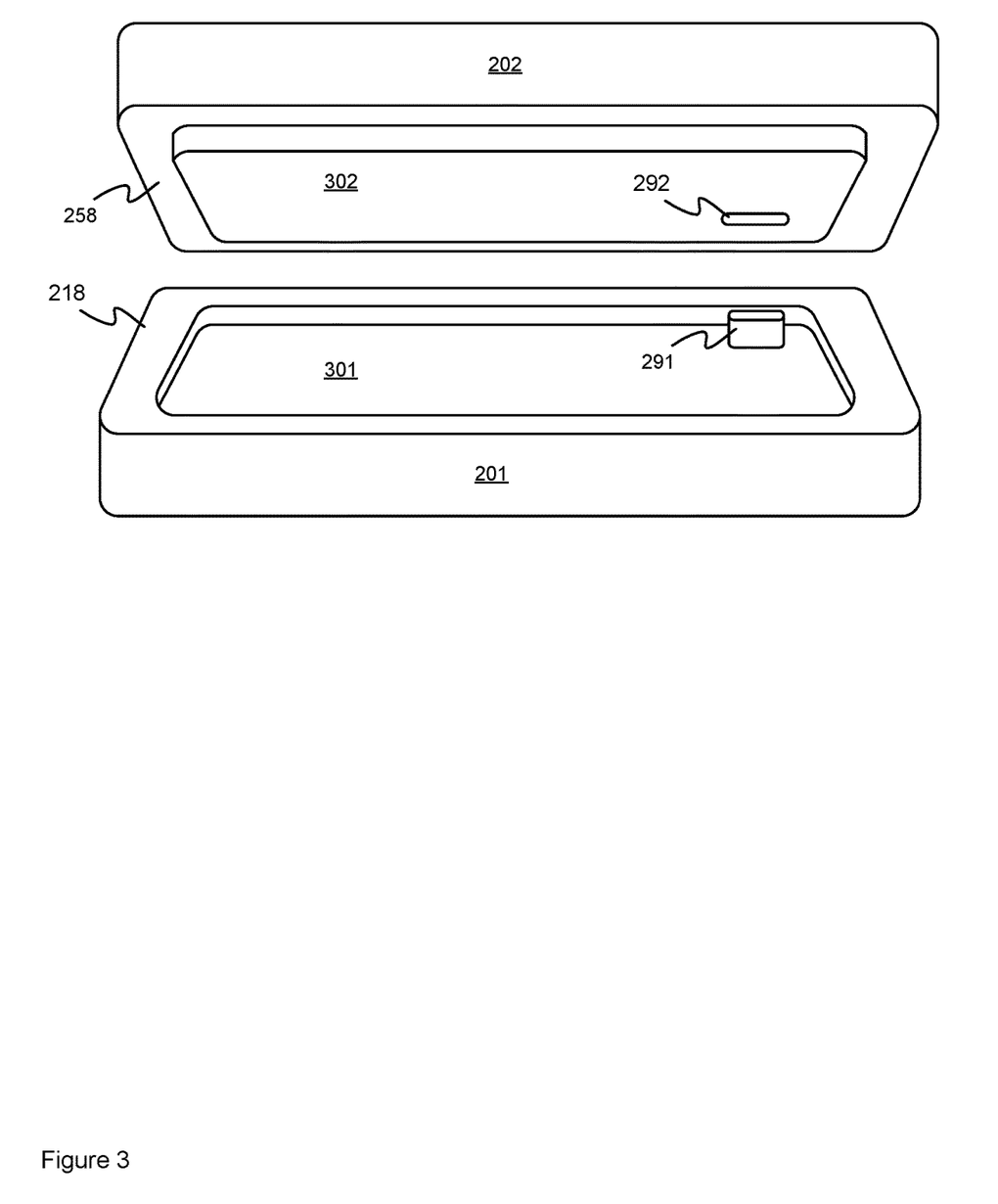
FIG. 3 is a perspective view of an example device of FIG. 2, with modules thereof separated.

Referring to FIG. 1, a module 101 to provide internet-of-things (IoT) sensor connectivity is depicted schematically. The module 101 may include additional components, such as various additional interfaces and/or input/output devices such as displays to interact with a user or an administrator of the module 101. The module 101 is to mate with a second module and/or a computing device, for example in a stack configuration, as best seen in FIG. 2 and FIG. 3. The module 101 is to: receive sensor data from a sensor; process the sensor data to generate processed sensor data; and transmit the processed sensor data to a remote device. Hence, the module 101 may be a computing device for providing sensor connectivity to the second module, for example when the module 101 is mated and/or in communication with the second module and/or a computing device. While hereafter the module 101 is described as being to mate with and/or communicate with a second module, the module 101 may similarly mate with and/or communicate with a computing device In the present example, the module 101 includes: a radio 115 to communicate with a sensor; a communication interface 117 to communicate with a second module; a chassis 118 to mate with a second module; and a processor 120 connected to the radio 115, the communication interface 117, and a memory 122. The processor 120 is to execute instructions 123 stored in the memory 122, and the instructions 123 are to: receive, via the radio 115, sensor data from the sensor; process the sensor data to generate processed sensor data; and transmit the processed sensor data to a remote device.

The radio 115 is to communicate with sensors, including, but not limited to, IoT sensors, and the like, which may be provisioned in a room and/or building and/or area in which the module 101 is deployed. The radio 115 comprises a radio and/or radios for communicating with sensors in a wireless manner, and/or according to any suitable protocol, including, but not limited to, short-range wireless protocols such as Bluetooth™ Low Energy (BLE) protocols, Zigbee™ protocols, and the like. Hence, the radio 115 may comprise a BLE radio and/or a Zigbee™ radio and/or any other suitable short-range wireless radio.

In the present example, the communication interface 117 is to communicate with a second module and, in a wired or wireless manner using, for example, a different protocol than is used by the radio 115. In some examples, the communication interface 117 is to communicate with a respective communication unit at the second module in a wired manner; for example, the communication interface 117 may comprise and/or be connected to a male electrical connector which mates with a female electrical connector of the respective communication unit of the second module, and the like, such that the processor 120 of the module 101 may communicate with a processor at the second module. However, the communication interface 117 may communicate with the respective communication unit of the second module via a wired connection, a cable and/or wirelessly.

In some examples, the module 101 may be further adapted to communicate with sensors in a wired manner. For example, the module 101 may further comprise a hardware port and/or ports to receive wired connectors and/or wired connections and/or cables wired to sensors. For example, the processor 120 may be in communication with such a hardware port and/or ports to receive sensor data in a wired manner and/or via a wired connection. In some of these examples, the communication interface 117, and/or another communication interface and/or communication unit may be configured to receive sensor data in a wired manner via a hardware port and/or ports and/or a wired connection, for example to implement a particular wired communication protocol, and convey the sensor data to the processor 120.

FIG. 1 further depicts the chassis 118 in a schematic cross-section. In the depicted example (though as best seen in FIG. 2 and FIG. 3), the chassis 118 may comprise a recess which mates with a complementary protrusion of a respective chassis of a second module, with the male electrical connector of the communication interface 117 in the recess of the chassis 118, and a female electrical connector of the respective communication interface of the second module in the complementary protrusion, or vice versa. Hence, in some examples, the module 101 may be "stacked" with a second module (and/or more than one second modules) such that the chassis 118 is to mate with the second module in a stack. Examples of such stacking, and the male and female electrical connectors, are best seen in FIG. 2 and FIG. 3.

However, in other examples, the module 101 and/or the chassis 118 may be in a docking configuration such that the chassis 118 mates with and/or communicates with a computing device by docking with the computing device. In other examples, the module 101 and/or the chassis 118 may be in a bar configuration such that the chassis 118 mates with a computing device by attaching to the computing device and/or an accessory thereof, as a bar, for example suspended from the computing device and/or an accessory thereof. Other mating and/or communication configurations are within the scope of the present specification.

The memory 122 is coupled to the processor 120, and includes a non-transitory machine-readable storage medium that may be any electronic, magnetic, optical, or other physical storage device. The non-transitory machine-readable storage medium of the memory 122 may include, for example, random access memory (RAM), electrically-erasable programmable read-only memory (EEPROM), flash memory, a storage drive, an optical disc, and the like. The memory 122 may also be encoded with executable instructions to operate the communication interface 117, and other hardware in communication with the processor 120. In other examples, it is to be appreciated that the memory 122 may be substituted with a cloud-based storage system.

The memory 122 may also store an operating system that is executable by the processor 120 to provide general functionality to the module 101, for example, functionality to support various applications such as a user interface to access various features of the module 101. Examples of operating systems include a Real-Time Operating System (RTOS), Windows™, macOS™, iOS™, Android™, Linux™, and Unix™. However, in other examples, the operating system may be stored at a second modular and/or computing device with which the module 101 is in communication. In yet further examples, the memory 122 may not store an operating system. The memory 122 may additionally store applications that are executable by the processor 120 to provide specific functionality to the module 101, such as those described in greater detail below, and which may include the instructions 123, which may be middleware software provided by the module 101.

The processor 120 may include a central processing unit (CPU), a microcontroller, a microprocessor, a processing core, a field-programmable gate array (FPGA), or similar. The processor 120 and memory 122 may cooperate to execute various instructions such as the instructions 123.

Accordingly, the processor 120 is to execute the instructions 123 stored on the memory 122 to implement the sensor connectivity and sensor data processing of the module 101. It is to be appreciated that in other examples, the sensor data processing could be shared with processing resources of a second module with which the first module 101 is in communication via the communication interface 117. Hence, the processor 120 is also to control and/or monitor the communication interface 117.

In some of these examples, the processor 120 and/or the instructions 123 may also be to: communicate, via the communication interface 117, with processing resources of a second module and/or computing device to at least partially process sensor data to generate processed sensor data. For example, the processor 120 and/or the instructions 123 may also be to: process the sensor data to generate processed sensor data at the module 101 and a second module and/or computing device using the processor 120 of the module 101 and a second processor of the second module and/or computing device.

In some of these examples, the processor 120 and/or the instructions 123 may also be to: watermark the processed sensor data prior to transmission to a remote device.

In some of these examples, the processor 120 and/or the instructions 123 may also be to: encrypt the processed sensor data prior to transmission to the remote device.

While the module 101 is described as communicating with one sensor, in some examples, the radio 115 may be to communicate with at least a first sensor and a second sensor. In these examples, the processor 120 and/or the instructions 123 may also be to: receive, via the radio 115 (and/or a wired connection), first sensor data from a first sensor and second sensor data from a second sensor; and generate processed sensor data from the first sensor data and the second sensor data.

In yet further examples, a second module and/or computing device, with which the module 101 is mated and/or in communication with, may comprise a sensor. In these examples, the processor 120 and/or the instructions 123 may also be to: receive, via the radio 115 (and/or a wired connection), first sensor data from a first sensor, and receive second sensor data from the second sensor at the second module and/or computing device; and generate processed sensor data from the first sensor data and the second sensor data.

In some of these examples, the processor 120 and/or the instructions 123 may also be to: transmit the processed sensor data to a remote device by: communicating, via the communication interface 117, the processed sensor data to a second module for transmission to a remote device using a respective network interface of the second module and/or the computing device.

In some examples, the module 101 further comprises a network interface for communicating with a remote device, and the processor 120 and/or the instructions 123 may also be to: transmit, via the network interface, the processed sensor data to the remote device.

FIG. 2 depicts a schematic block diagram of a system 200 that includes a first module 201, similar to the module 101, and a second module 202 that are mated to form a device 203. Hence, the device 203 comprises the first module 201 and the second module 202. The first module 201 is similar to the module 101, and like components of the first module 201 bear like reference to their counterparts in the module 101, except in a "200" series rather than in a "100" series. Furthermore, the first module 201 may include all the functionality of the module 101 as described above.

The first module 201 includes a radio 215 to communicate with a first sensor; a first communication interface 217 to communicate with the second module 202; a first chassis 218 to mate with the second module 202; a first processor 220 connected to the radio 215, the first communication interface 217, and a first memory 222, the first processor 120 to execute first instructions 223 stored in the first memory 222, the first instructions to 223: receive, via the radio 215, first sensor data from the first sensor.

For example, as depicted, the radio 215 is in communication with a sensor 231 and a sensor 232 via respective connections 233, 234 which may include BLE and/or Zigbee™ connections, as described above. While as depicted the radio 215 is in communication with two sensors 232, 232, the radio 215 may be in communication with as few as one sensor, or more than two sensors, depending, for example, on the number of sensors deployed in a range of the radio 215. The sensors 231, 232 are not particularly limited and each may comprise a motion detector and/or a passive infrared (PIR) sensor and/or an environmental sensor and/or a temperature sensor and/or a humidity sensor and/or an ambient light sensor and/or a camera and/or a microphone and/or an IoT sensor, and the like.

In some examples, the module 201 may be further adapted to communicate with sensors in a wired manner. For example, the module 201 may further comprise a hardware port and/or ports to receive wired connectors and/or wired connections and/or cables wired to sensors. For example, the processor 220 may be in communication with such a hardware port and/or ports to receive sensor data in a wired manner and/or via a wired connection. In some of these examples, the communication interface 217, and/or another communication interface and/or communication unit may be configured to receive sensor data in a wired manner via such a hardware port and/or ports and/or a wired connection, for example to implement a particular wired communication protocol, and convey the sensor data to the processor 220.

As depicted, the first module 201 further comprises a network interface 237 for communicating with a remote device 240, for example via a communication network 241 (interchangeably referred to hereafter as the network 241) and a connection 243. The network interface 237 may comprise a wired or wireless interface including, but not limited to, a WiFi interface such that the connection 243 is a WiFi connection. Indeed, the network interface 237 is to communicate with the network 241 such as a wired or wireless network which may include a cellular network, a WiFi network, and the like. The network 241 and the connection 243 may be wireless, and/or at least partially wired, as desired.

The network 241 may comprise any suitable combination of a WiFi network, a local area network, a wide area network, the Internet, a cell phone network, and the like. The remote device 240 may communicate with the network via a respective connection 244 which may include a wired and/or wireless connection, and the like.

The second module 202 may be similar to the first module 201 but may not be to communicate with the sensors 231, 232. Hence, the second module 202 may not include a radio similar to the radio 215.

Indeed, the second module 202 may be dedicated to functionality that is different from communicating with the sensors 231, 232, for example to provide general computing functionality and/or to act as a computing device, a personal computer, and the like; hence, the second module 202 may also be referred to as a computing device. For example, the memory 262 may also store an operating system that is executable by the processor 260 to provide general functionality to the second module 202 and/or the device 203, including, but not limited to, functionality to support various applications such as a user interface to access various features of the device 203. Examples of operating systems include a RTOS, Windows™, macOS™, iOS™, Android™, Linux™, and Unix™' Indeed, in some examples, the first module 201 may not store an operating system, but may be dedicated to providing sensor connectivity to the device 203.

Indeed, mating the first module 201 with the second module 202 may generally add sensor connectivity and sensor data processing to the second module 202, and the device 203 as a whole. Furthermore, as sensors in the area of the device 203 change and/or have different radio capabilities, and the like, the first module 201 may be replaced at the device 203 with another module providing sensor connectivity functionality for the new sensors. Furthermore, each the modules 201, 202 may be referred to as a "thing" in an Internet of Things environment; indeed, the modules 201, 202 may comprise sensors and/or radios for communicating with sensors, and the like. Hence, the sensors 231, 232 may alternatively be referred to as sensor modules that are mated wirelessly to the modules 201, 202, that are mated to each other via a wired connection 289.

As depicted the second module 202 comprises: a second sensor 252; a second communication interface 257 to communicate with the first module 201, and in particular the first communication interface 217; a second chassis 258 to mate with the first chassis 218 of the first module 201; a second processor 260 connected to the second sensor 252, the second communication interface 257, and a second memory 262, the second processor 260 to execute second instructions 263 stored in the second memory 262, the second instructions to: receive second sensor data from the second sensor 252. However, the second sensor 252 may be optional.

When present, the sensor 252 may be similar to, or different from, either of the sensors 231, 232, and may comprise a microphone, an IoT sensor, and the like. The communication interface 257, the processor 260, the memory 262 are generally respectively similar to the communication interface 217, the processor 220, and the memory 222. The second module 202 further comprises a second network interface 277 similar to the first network interface 237 which may alternatively be used to communicate with, and/or transmit processed sensor data to, the remote device 240.

For example, the first processor 220 generally comprises processing resources of the first module 201, and the second processor 260 generally comprises processing resources of the second module 202. The modules 201, 202 may be configured to share processing resources, for example to process sensor data from the sensor 231, the sensor 232 and/or the sensor 252, and transmit processed sensor data to the remote device 240 using the first network interface 237 and/or the second network interface 277.

Indeed, the first instructions 223 and the second instructions 263 may be further to: cause the first processor 220 and the second processor 260 to: share respective processing resources using the first communication interface 217 and the second communication interface 257; process first sensor data (e.g., from the sensor 231 and/or the sensor 232) and second sensor data (e.g., from the sensor 252) to generate processed sensor data; and transmit the processed sensor data to the remote device 240.

Hence the processing of the sensor data may occur at one of the processors 220, 260 and/or at a combination of the processor 220, 260. The device 203 may determine which of the processor 220, 260 to use to generate the processed sensor data based on one factor or a plurality of factors.

For example, the first instructions 223 and the second instructions 263 may be further to: determine which of the first processor 220 and the second processor 260 to use to generate the processed sensor data based on respective processing speed of the first processor 220 and the second processor 260. In some examples, the faster of the two processors 220, 260 may be used to generate the processed sensor data.

Similarly, the first instructions 223 and the second instructions 263 may be further to: determine which of the first processor 220 and the second processor 260 to use to generate the processed sensor data based on respective heat generation of the first processor 220 and the second processor 260. In some examples, the processor 220, 260 which generates the smallest amount of heat may be used to generate the processed sensor data.

Furthermore, the first instructions 223 and the second instructions 263 may be further to: transmit the processed sensor data to the remote device 240 using the first network interface 237 of the first module 201 or the second network interface 277 of the second module 202. Selection of a network interface 237, 277 may be based on respective speed, available bandwidth, and the like.

Furthermore, while sharing of the processing resources of each of the modules 201, 202 are described with respect to processing the sensor data and/or transmitting the processed sensor data, the modules 201, 202 may share processing of the instructions 223, 263 and/or general processing of data therebetween. For example, when the modules 201, 202 are mated, the processors 220, 260 may communicate and share the instructions 223, 263, and the instructions 223, 263 may be partially stored at each of the memories 222, 262, and processing of the instructions 223, 263 may occur at one or both of the processors 220, 260 to provide sensor connectivity, for example as middleware software for providing sensor connectivity to the device 203. Indeed, when the modules 201, 202 are mated the modules 201, 202 may generally act as a single computing device; in general, for example, the combination of the processors 220, 260 generally expands the computing power of each of the modules 201, 202. Hence, such sharing of processing may occur for any applications stored on the modules 201, 202 including, but not limited to, processing of an operating system and/or any other type of application. Indeed, the expanded computing power may enable security features such as obfuscation and/or watermarking, and the like, as described in more detail below; for example, one of the modules 201, 202 alone may not be able to perform such security features in real-time, and the like, but their combined computing power may enable such security features being performed in real-time.

The processing and/or sharing of the sensor data and/or sharing processing of data between the modules 201, 202 (as well as general communications between the modules 201, 202 for sharing processing resources) generally occur via the communication interfaces 217, 257, which are depicted in communication with each other via the connection 289 which, as depicted, comprises a wired connection. For example, with further reference to FIG. 3, which depicts a top perspective view of the first module 201, and a bottom perspective view of the second module 202, the first communication interface 217 may comprise and/or be connected to a male electrical connector 291, for example which extends from a recess 301 of the chassis 218, the recess 301 located on a top-side of the module 201. Similarly, the second communication interface 257 may comprise and/or be connected to a female electrical connector 292, located in a protrusion 302 of the chassis 258, the protrusion 302 located at a bottom-side of the module 202. The protrusion 302 of the chassis 258 is complementary to the recess 301 of the chassis 218 such that, when the second module 202 is stacked on top of the first module 201, the protrusion 302 inserts into the recess 301, and the chassis 218, 258 mate. Furthermore, the electrical connectors 291, 292 are positioned in complementary locations such that the electrical connectors 291, 292 mate when the modules 201, 202 are stacked. Hence, the processors 220, 260 may communicate via the connection 289 formed by the mated electrical connectors 291, 292.

The device 203 may include additional components and/or modules, such as various additional interfaces and/or modules and/or input/output devices such as displays to interact with a user of the device 203. Indeed, while the device 203 is depicted with two modules 201, 202, the device 203 may include additional modules which may be stacked with the modules 201, 202, which each additional module adding additional functionality to the device 203 including, but not limited to, a speaker module, a CD (compact disc) and/or DVD (digital videodisc) reader and/or player, and the like. For example, the first module 201 may include a protrusion on a bottom-side of the chassis 218, that is similar to protrusion 302 of the second module 202, and that includes a female electrical connecter similar to the female electrical connector 292; additional modules may have a chassis and male/female electrical connectors, similar to the first module 201, and mate with the first module 201, similar to how the first module 201 mates with the second module 202. Furthermore, processing resources may be shared among all the modules of the device 203, including processing of sensor data and/or transmitting of processed sensor data. Furthermore, additional modules may include additional sensors similar or different from the sensor 252. Furthermore each additional module added to the device 203 generally expands the processing power and/or the functionality of the device 203.

While the modules 101, 201, 202, and chassis thereof, have been described with respect to a physical stacking configuration, the modules 101, 201, 202 may have other types of physical configurations.

Figure 4:
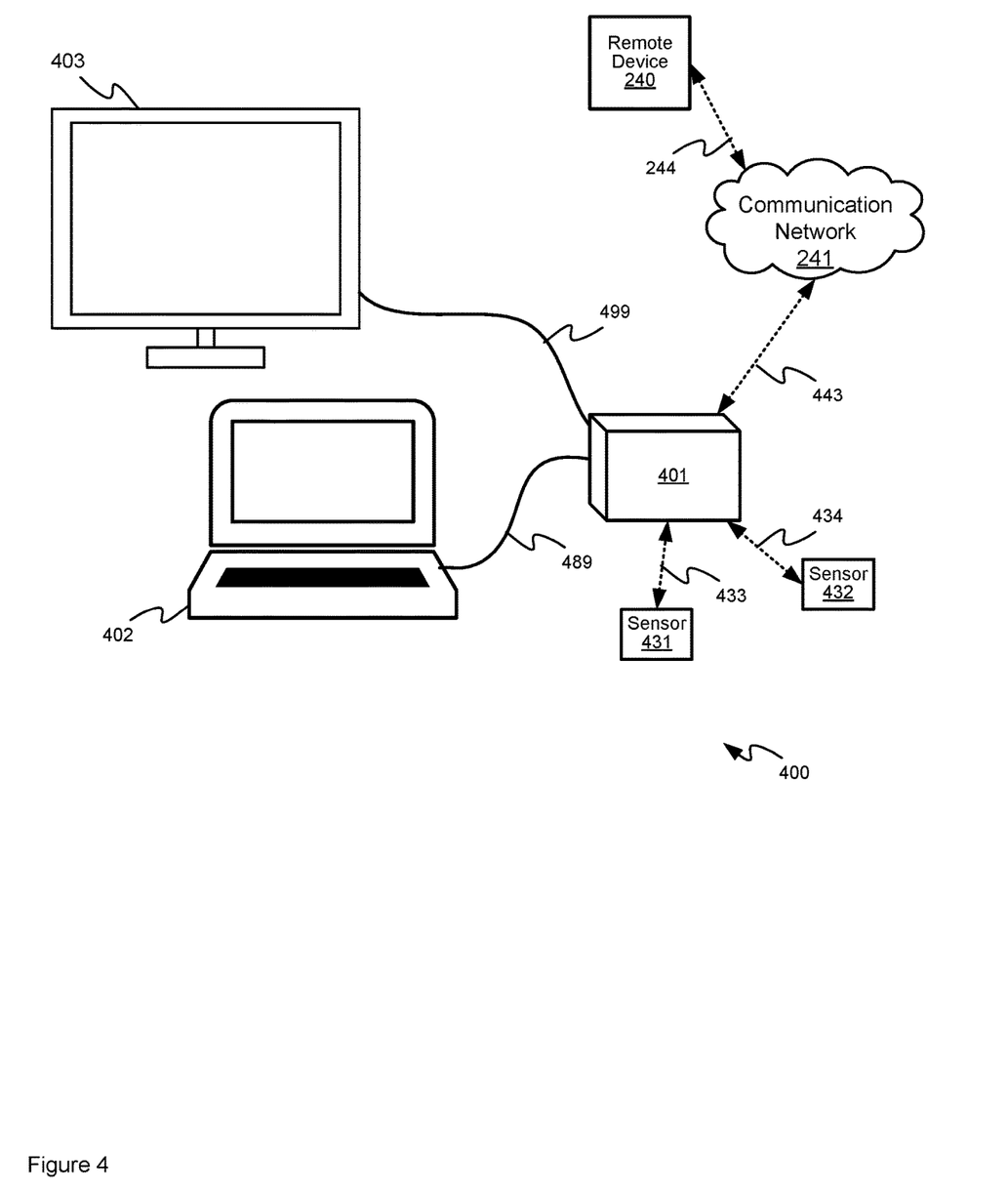
FIG. 4 is a block diagram of a system that includes another example module that provides internet of things sensor connectivity to a computing device.

For example, attention is next directed to FIG. 4 which depicts a system 400 that includes a module 401, a computing device 402, and a display device 403. The module 401 is generally in the configuration of a docking station but is otherwise similar to the modules 101, 201. For example, as depicted, the module 401 provides docking station functionality for the computing device 402 which, in the depicted example, is in the configuration of a laptop computer. Otherwise, the computing device 402 may be similar to the second module 202 and includes a radio for communicating with sensors, similar to the radio 215, and the like. Hence, the module 401 is configured to receive sensor data from a sensor 431 and/or a sensor 432 (and optionally a sensor of the computing device 402, not depicted, the sensors 431, 432 being similar to the sensors 231, 232), via respective connections 433, 434 (similar to the connections 233, 234), generate processed sensor data and transmit the processed sensor data to the remote device 240. The module 401 is in communication with the remote device 240 via the network 241 (or another communication network) via a connection 443 which may be wired or wireless as desired and/or similar to the connection 243. The remote device 240 is in communication with the network via the connection 244 described above. As with the device 203, the combination of the module 401 and the computing device 402 may share processing resources to generate the processed sensor data. The module 401 and the computing device 402 are hence in communication via a connection 489 which may be wired (as depicted) and/or wireless as desired. The connection 489 further enables the module 401 to provide network connectivity to the computing device 402 (e.g., via the network 241 and the connection 243), as well as provide the computing device 402 with access to accessories, such as the display device 403 via a connection 499, and/or provide any other suitable functionality to the computing device 402 associated with a docking station.

Furthermore, while as depicted the module 401 is in the physical configuration of a box, the module 401 may be in any physical configuration of a docking station including, for example, a physical configuration where the computing device 402 may be placed onto the module 401 and/or the computing device 402 physically mates with the module 401.

Figure 5:
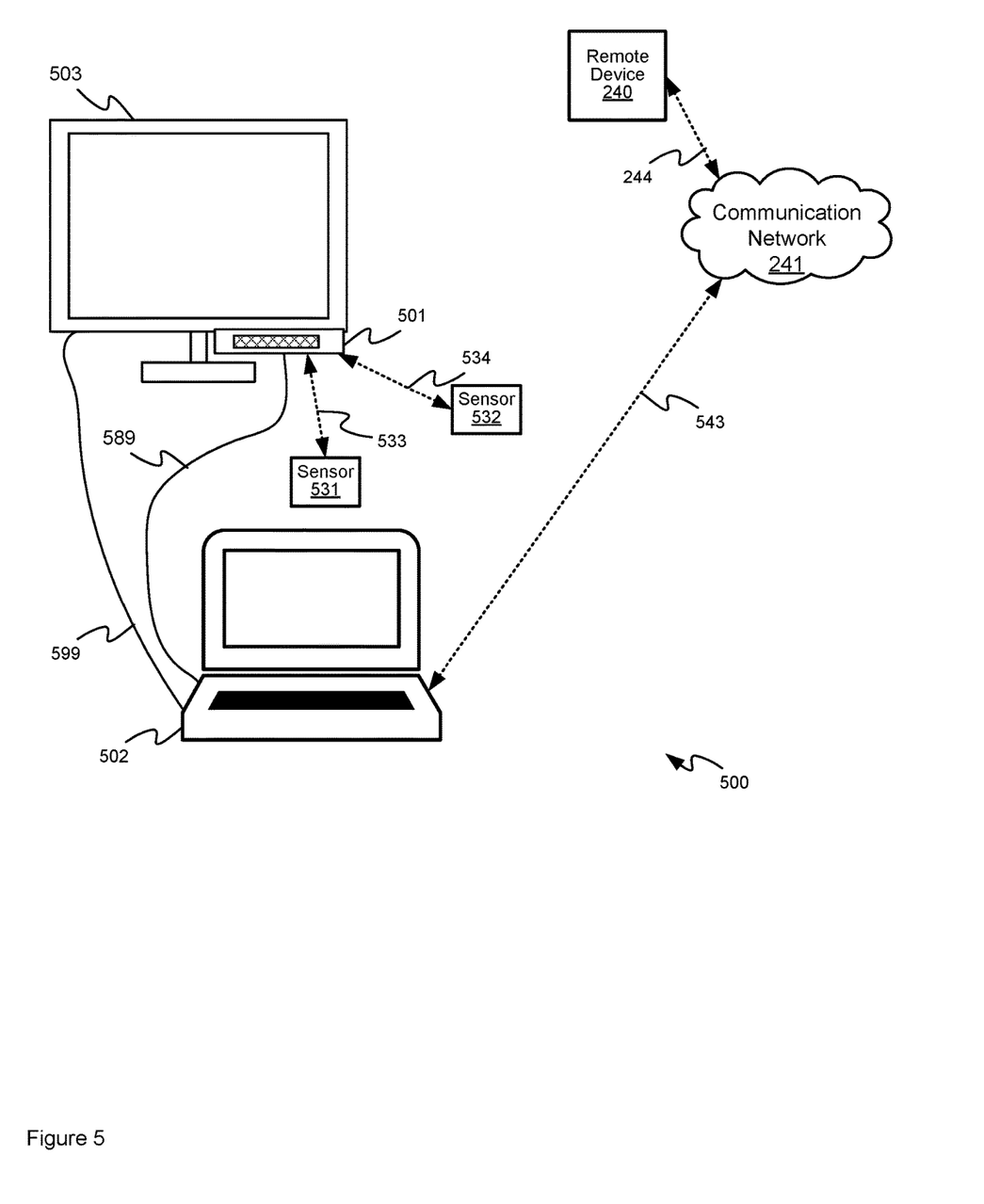
FIG. 5 is a block diagram of a system that includes another example module that provides internet of things sensor connectivity to a computing device.

Attention is next directed to FIG. 5 which depicts a system 500 that includes a module 501, a computing device 502, and a display device 503. The module 501 is generally in a bar configuration, and specifically a sound bar configuration, but is otherwise similar to the modules 101, 201, and hence includes a radio for communicating with sensors, similar to the radio 215, and the like. As depicted, the module 501 is attached to and/or mated with the display device 503, but may be attached to and/or mated with, the computing device 502 or another accessory of the computing device 502. For example, as depicted, the module 501 provides sound bar functionality for the computing device 502 which, in the depicted example, is in the configuration of a laptop computer. Otherwise, the computing device 502 may be similar to the second module 202. In general, the module 501 is configured to received sensor data from a sensor 531 and/or a sensor 532 (and optionally a sensor of the computing device 502, not depicted, the sensors 531, 532 being similar to the sensors 231, 232), via respective connections 533, 534 (similar to the connections 233, 234)), generate processed sensor data and transmit the processed sensor data to the remote device 240. In these examples, and in contrast to previous examples, the computing device 502 is in communication with the remote device 240 via the network 241 (or another communication network) via a connection 543 which may be wired or wireless as desired and/or similar to the connection 243. Hence, the processed sensor data is transmitted to the remote device 240 via a network interface of the computing device 502. The remote device 240 is in communication with the network via the connection 244 described above. As with the device 203, the combination of the module 501 and the computing device 502 may share processing resources to generate the processed sensor data. The module 501 and the computing device 502 are hence in communication via a connection 589 which may be wired (as depicted) and/or wireless as desired. The connection 589 further enables the module 501 to provide sound bar functionality to the computing device 502 (e.g., via the network 241 and the connection 243). As depicted, the computing device 502 is in communication with the display device 503 via a connection 599.

Indeed, the examples of FIG. 2, FIG. 4, and FIG. 5 show that connectivity between the various modules described herein, and a remote device, may occur via a network interface of a module and/or a network interface of a computing device in communication with a module.

Figure 6:
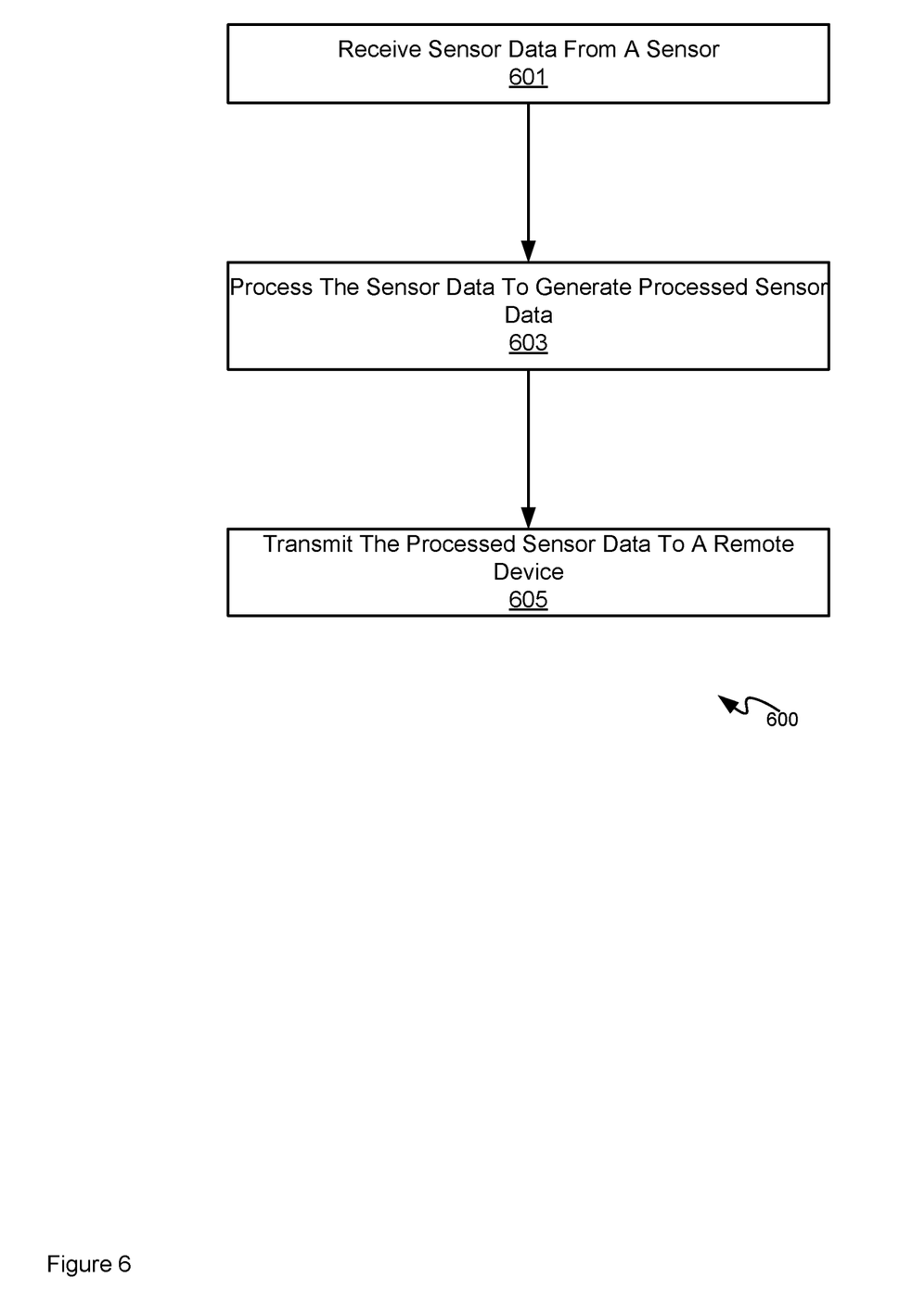
FIG. 6 is a flowchart of an example of a method for receipt and processing of sensor data.

Referring to FIG. 6, a flowchart of a method 600 for receipt and processing of sensor data is depicted. In order to assist in the explanation of method 600, it will be assumed that method 600 may be performed with the module 101, and specifically by the processor 120. Indeed, the method 600 may be one way in which the module 101 may be configured to interact with sensors. Furthermore, the following discussion of method 600 may lead to a further understanding of the processor 120, and the module 101 and its various components. Furthermore, it is to be emphasized, that method 600 may not be performed in the exact sequence as shown, and various blocks may be performed in parallel rather than in sequence, or in a different sequence altogether.

Furthermore, the method 600 may also be implemented by the first module 201 using the processor 220 and may be one way in which the module 201 may configured to interact with the sensors 231, 232, 252. Similarly, the method 600 may also be implemented by either of the modules 401, 501, and specifically by processors thereof.

Beginning at block 601, the processor 120 receives sensor data from a sensor. For example, the processor 120 may receive sensor data from one sensor and/or more than one sensor within a range of the radio 115 using one protocol and/or more than one protocol. However, at the block 601, the processor 120 may receive sensor data in a wired manner, for example from a sensor wired to a hardware port and/or a sensor data from another module (e.g., sensor data from the sensor 252 from the module 202, for example when the module 101 is mated with the module 202).

At a block 603, the processor 120 processes the sensor data to generate processed sensor data. The processor 120 may process the sensor data to encrypt the sensor data and/or watermark the sensor data and/or generate virtualized sensor data and/or aggregate the sensor data into virtualized sensor data. For example, the processor 120 may encrypt the sensor data using a cryptographic key provisioned in the instructions 123 and/or the memory 122. Similarly, the processor 120 may watermark the sensor data to identify the sensor data as being associated with a given entity, a given building, and the like, and/or any other suitable type of association; such watermarking may include, but is not limited to, hashing the sensor data, encrypting the sensor data, and the like with, however, inclusion of data that identifies the sensor data as being associated with a given entity, a given building, and the like, and/or any other suitable type of association.

In particular, the processed sensor data may include watermarks where reusability of the processed sensor data is restricted to endpoints and/or computing devices that "know" and/or have been provisioned with the watermark. Hence, watermarking of the processed sensor data may generally identify the processed sensor data as being "owned" by an entity without revealing the specific sensors that generated the data. For example, an entity watermark could be used to watermark images and/or processed sensor data streams (e.g., a frequency watermark) to identify that the processed sensor data belongs to the entity, but the watermark may not identify where, within rooms and/or a building and/or buildings and/or a campus associated with the entity, the original sensor data was generated. This may allow for general correlation of the processed sensor data with the entity in multi-tenant environments (e.g., a building that includes multiple entities and multiple sensors) without identifiable information.

Generating virtualized sensor data and/or aggregating sensor data may include obfuscating sensor data and/or combining sensor data from more than one sensor generate and/or.

For example: a camera sensor may acquire images which are received as sensor data at the processor 120; however processed sensor data generated from the images may indicate only presence or absence of a person (e.g., versus an object) without including an image of the person in the processed sensor data. Hence, the image of the person is obfuscated, and this may ensure privacy, since no information that identifies a person is provided in the processed sensor data. Put another way, the processed sensor data may be referred to as sensor data for a virtualized presence sensor. However, data obfuscation may occur in any suitable manner including, but not limited to, scrambling and/or masking of information in the sensor data, such as obscuring faces of people in images.

Similarly, a "comfort" virtual sensor may be generating by combining sensor data from a temperature sensor and a humidity sensor, and the processed sensor data may include "comfort values" and not temperature/humidity values. For example, a first combination and/or range of temperature/humidity values may be associated with the value "comfortable", and a second combination and/or range of temperature/humidity values may be associated with the value "uncomfortable". Hence, the processed sensor data may include one of the value "comfortable" and the value "uncomfortable", and not include the temperature/humidity values that resulted in the comfort value. Furthermore, each of a temperature sensor and a humidity sensor may be operating and/or communicating according to different protocols (e.g., the temperature sensor may be operating and/or communicating according to a ZigBee™ protocol, while the humidity sensor may be operating and/or communicating according to a Bluetooth™ protocol).

Indeed, when the sensor data is virtualized, watermarked, obfuscated, and the like, in the processed sensor data, the processed sensor data may be used to compile trends and metric information that may be used for maintenance and fault management of the sensors including, but not limited to, determining whether any sensor are faulty and accommodating for any faulting sensors (e.g., omitting such faulty sensor data from metrics and the like).

In yet further examples, the processor 120 may time-stamp the processed sensor data such that processed sensor data from various modules (e.g., similar to the module 101) deployed in various locations may be correlated.

In yet further examples, the processor 120 may include an identifier of the module 101 in the processed sensor data (e.g., a media access control (MAC) address and the like.

At a block 605, the processor 120 transmits the processed sensor data to a remote device. For example, when the module 101 includes a network interface, similar to the network interface 237, the module 101 may transmit the processed sensor data using the network interface of the module 101. However, in other examples (as depicted in FIG. 1), the module 101 may not include a network interface, and the module 101 may transmit the processed sensor data using a network interface of a module and/or computing device mated to, and/or in communication with, the module 101. For example, the module 101 may be mated to the second module 202 and transmit the processed sensor data using the network interface 277 of the second module 202.

The processor 120 may transmit the processed sensor data in a time synchronized manner. For example, the processor 120 may transmit the processed sensor data within a given time period from receiving the sensor data at the block 601. In yet further examples, the processor 120 may transmit the processed sensor data with metadata identifying the module 101, for example an internet protocol (IP) address of the module 101 and/or a device into which the module 101 has been incorporated (e.g., the device 203 and the like).

The remote device (e.g., the remote device 240) receives the processed sensor data. The remote device may be to: further process the processed sensor data; correlate the processed sensor data with processed sensor data from other modules (e.g., based on a time-stamp and/or a time of transmission and/or a time of receipt, and the like); correlate the processed sensor data with a location (e.g., based on an identifier of the module 101 in the processed sensor data and/or in metadata received with the processed sensor data).

Figure 7:
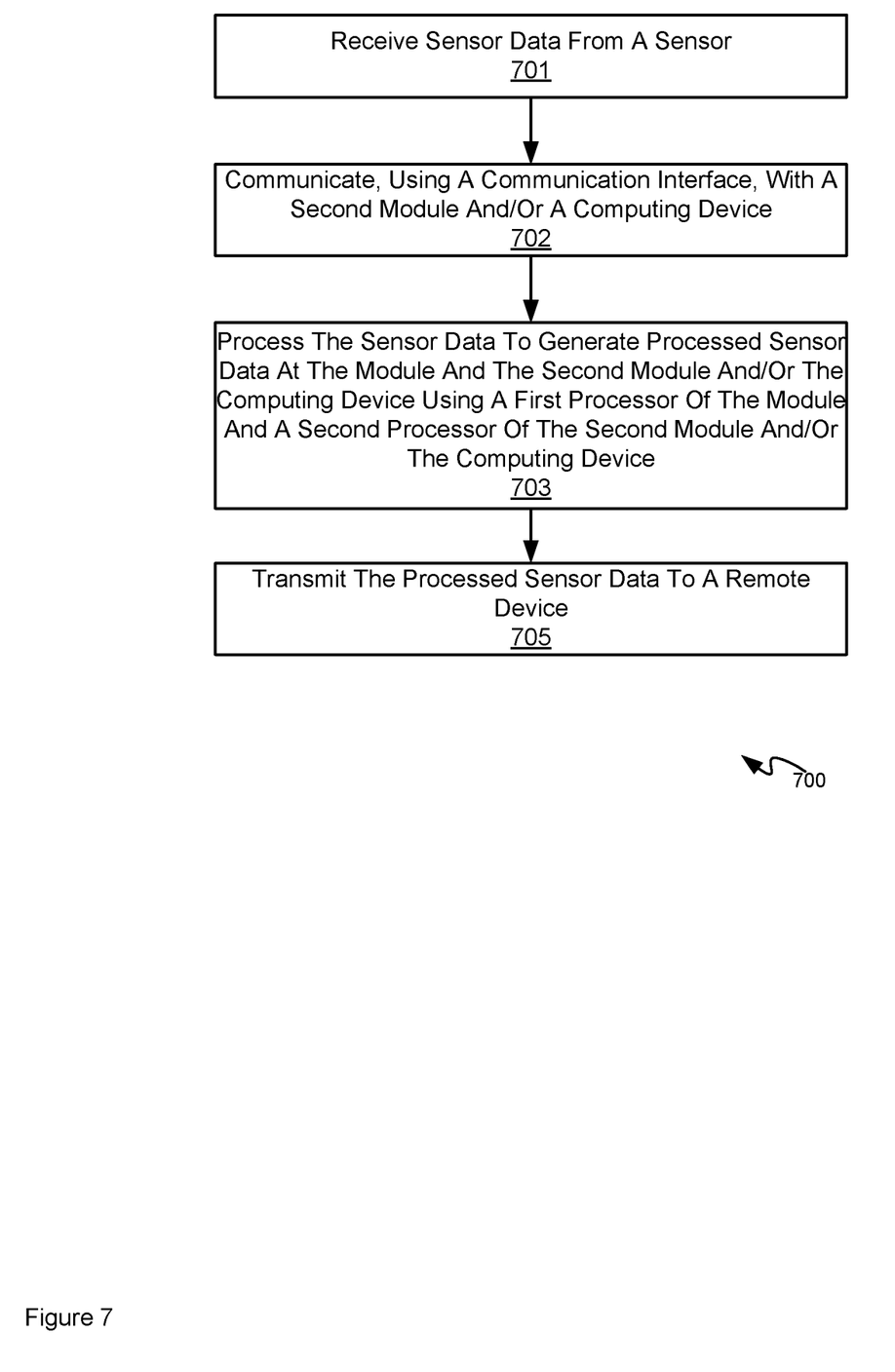
FIG. 7 is a flowchart of an example of another method for receipt and processing of sensor data.

Referring to FIG. 7, a flowchart of a method 700 for receipt and processing of sensor data is depicted. In order to assist in the explanation of method 700, it will be assumed that method 700 may be performed with the first module 201, and specifically by the processor 220. Indeed, the method 700 may be one way in which the first module 201 may be configured to interact with the sensors 231, 232, 252. Furthermore, the following discussion of method 700 may lead to a further understanding of the processor 220, the module 201 and its various components, the module 202 and its various components, and the device 203. Furthermore, it is to be emphasized, that method 700 may not be performed in the exact sequence as shown, and various blocks may be performed in parallel rather than in sequence, or in a different sequence altogether.

Furthermore, the method 700 may also be implemented by the module 101 using the processor 120, for example when mated with the second module 202, and may be one way in which the module 101 may configured to interact with sensors.

In general, the method 700 is similar to the method 600, with like elements having like numbers, however the method 700 includes communication with the second module 202. Similarly, the method 700 may also be implemented by either of the modules 401, 501, and specifically by processors thereof.

Beginning at block 701, the processor 220 receives sensor data from a sensor, for example, the sensor 231 and/or the sensor 232 via the radio 215. In some examples, at the block 701, the processor 220 may further receive second sensor data from the second sensor 252 at the second module 202, for example in a wired manner. Similarly, at the block 701, the processor 22—may receive sensor data in a wired manner, for example from a sensor wired to a hardware port of the module 202.

At a block 702, the processor 220 communicates, via the communication interface 217, with the second module 202 and/or a computing device; for example, when the method 700 is being implemented at the module 401 and/or the module 501, processors thereof communicate with the computing device 402 and/or the computing device 502. The processor 220 may communicate with the processor 260 via the communication interfaces 217, 257 and the connection 289. For example, the processor 220 may communicate with the processor 260 to share processing resources between the modules 201, 202 in order to share processing of the instructions 223, 263 and/or to implement middleware software thereof. Similarly, at the block 702, the module 401 and the computing device 402 may communicate to share processing resources therebetween and/or the module 501 and the computing device 502 may communicate to share processing resources therebetween.

At a block 703, the processor 220 and/or the processor 260 processes the sensor data to generate processed sensor data, similar to as described above with respect to the block 603. Hence, the processed sensor data may be generated by the processor 220, the processor 260, and/or a combination thereof based, for example, on respective processing speeds, respective heat generation, and the like. Put another way, at the block 703, the sensor data is processed to generate processed sensor data at a module (e.g., the module 101, 201, 401, 501) and a computing device (e.g., the module 202, the computing device 402, 502) using a first processor of the module and a second processor of the computing device.

Furthermore, when the processor 220 and/or the processor 260 receives, at the block 701, the second sensor data from the second sensor 252 of the second module 202, at the block 703 the processor 220 and/or the processor 260 may further generate the processed sensor data from the sensor data received from the sensor 231 and/or the sensor 232, and the second sensor data from the second sensor 252.

At a block 705, the processor 220 and/or the processor 260 transmits the processed sensor data to the remote device 240 using, for example, the network interface 237 and/or the network interface 277.

In some examples, the processor 220 and/or the processor 260 may watermark the processed sensor data prior to transmission to the remote device 240. In further examples, the processor 220 and/or the processor 260 may encrypt the processed sensor data prior to transmission to the remote device 240. Indeed, the processor 220 and/or the processor 260 may generate the processed sensor data in any suitable manner, as described above with respect to the method 600.

Figure 8:
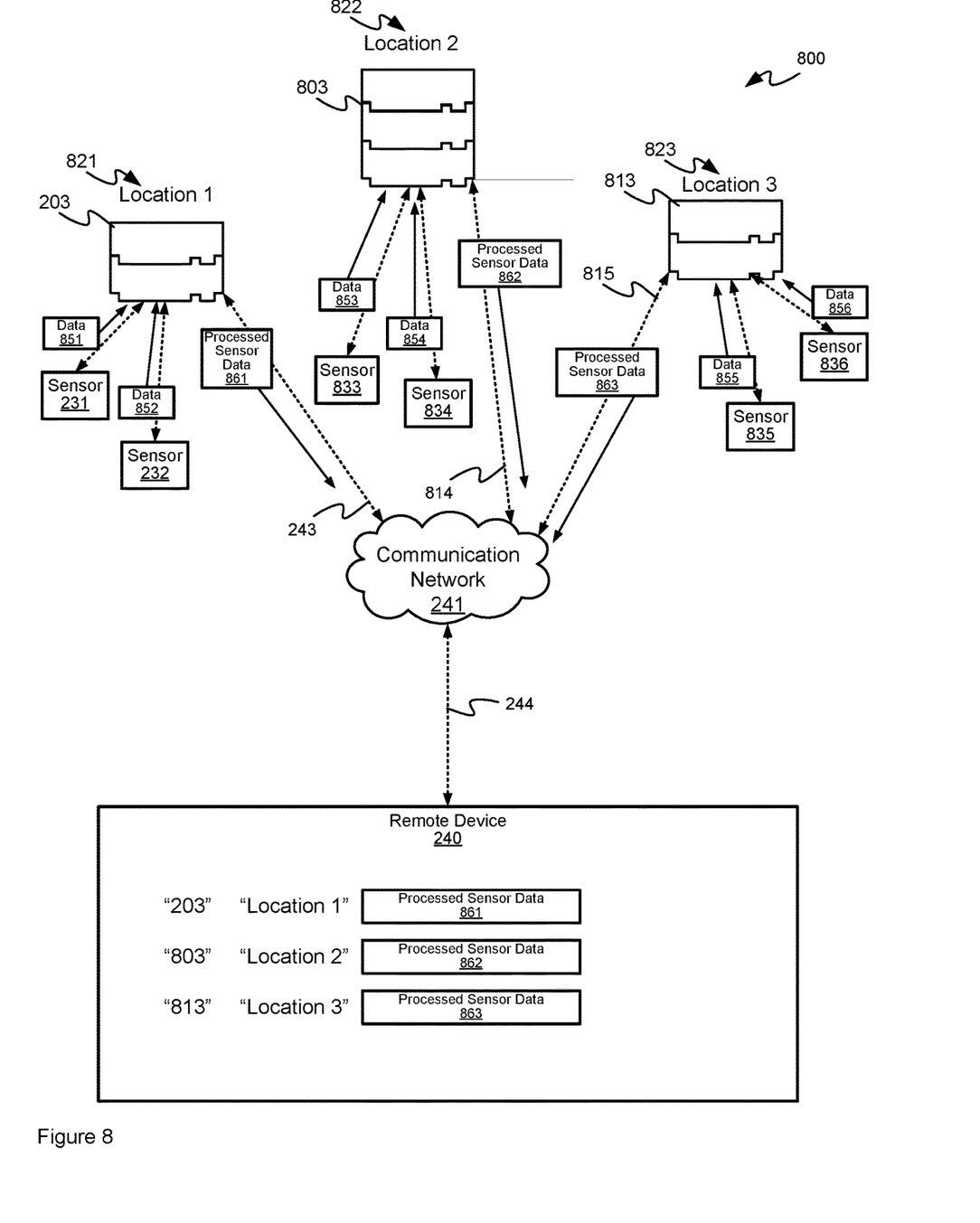
FIG. 8 is a block diagram of a system that includes a plurality of example modules that provides internet of things sensor connectivity to computing devices.

Referring to FIG. 8, a schematic representation of a network system 400. The system 800 includes the device 203, and similar devices 803, 813, as well as the remote device 240 in communication with the network 241 via the connection 244, the device 203 in communication with the network 241 via the connection 243, and each of the devices 803, 813 in communication with the network via similar respective connections 814, 815. While not depicted, the system 800 may further include the module 401 and/or the module 501 and/or a device 203, 803, 813 may be replaced with the module 401 and/or the module 501. Regardless, each of the devices 203, 803, 813 are implementing the method 600 and/or the method 700. Furthermore, while the devices 203, 813 are depicted with two modules each, the device 803 is depicted with three modules; hence, the functionality and/or the processing power of the device 803 may be expanded with respect to the devices 203, 813. However, each of the devices 203, 803, 813 may include more than three modules, to generally expand the functionality and/or the processing power thereof.

As depicted, each of the devices 203, 803, 813 is located at a respective location 821, 822, 823, and the remote device 240 stores an identifier of each location 821, 822, 823 (e.g., "Location 1", "Location 2", "Location 3") in association with a respective identifier of each of the devices 203, 803, 813 (e.g., "203", "803", "813"). Such identifiers and locations may be provisioned at the remote device 240 when respective sensor connectivity modules are deployed at the devices 203, 803, 813.

As depicted, the device 203 is in communication with respective sensors 231, 232 at the location 821 via respective local connections (depicted in broken lines), the device 803 is in communication with respective sensors 833, 834 via respective local connections (also depicted in broken lines), at the location 822, and the device 813 is in communication with respective sensors 835, 836 at the location 821 via respective local connections (also depicted in broken lines). The sensors 833, 834, 835, 836 may be similar to, or different from, the sensors 231, 232.

As depicted, the sensors 231, 232 are providing respective sensor data 851, 852 to the device 203 via the respective local connections, the sensors 833, 834 are providing respective sensor data 853, 854 to the device 803 via the respective local connections, and the sensors 835, 836 are providing respective sensor data 855, 856 to the device 813 via the respective local connections.

As each of the devices 203, 803, 813 are implementing the method 600 and/or the method 700, each of the devices 203, 803, 813 generate respective processed sensor data 861, 862, 863 and transmit the processed sensor data 861, 862, 863 to the remote device 240 via the respective connections 243, 814, 815.

The remote device 240 receives the processed sensor data 861, 862, 863 and stores each in association with the respective identifiers of the locations 821, 822, 823. For example, the processed sensor data 861, 862, 863 may include identifiers associated with each of the devices 203, 803, 813 which may be compared to the identifiers of the devices 203, 803, 813 stored at the remote device to determine from which the device 203, 803, 813, and hence which location 821, 822, 823, the processed sensor data 861, 862, 863 was received.

Hence, rather than store a location of each of the sensors 231, 232, 833, 834, 835, 836, the remote device 240 may store a location of each of the devices 203, 803, 813 and associate the processed sensor data 861, 862, 863 which respective locations based on identifiers of the devices 203, 803, 813.

Hence, the location of the devices 203, 803, 813 may be associated with sensor zones defined by the range of respective radios thereof, and which may reduce power required for the wireless radios in the sensors 231, 232, 833, 834, 835, 836 since the sensors 231, 232, 833, 834, 835, 836 are in proximity to the devices 203, 803, 813. For example, the devices 203, 803, 813 may be deployed to specifically create sensor zones at the locations 821, 822, 823 where the power used by the sensors 231, 232, 833, 834, 835 may be reduced (e.g., as compared to using, for example, a central connectivity hub that communicates with sensors), which may increase the operating life of the sensors 231, 232, 833, 834, 835, 836, which may reduce a maintenance schedule of the sensors 231, 232, 833, 834, 835, 836.

Furthermore, such sensor zones may allow for finer grained policies by administrators of the locations 821, 822, 823 (such as internet technology personnel), to control devices and/or entities that may access to sensor data, and the like; for example, such access may be managed on the basis of the locations of the devices 203, 803, 813 rather than locations of the sensors 231, 232, 833, 834, 835, 836.

Furthermore, as new types of sensors are deployed at the locations 821, 822, 823, each of the devices 203, 803, 813 may be upgraded with new hardware sensor communication functionality by replacing a respective sensor connectivity module with a new respective sensor connectivity module.

Furthermore, the identifiers of the location 821, 822, 823 and/or the identifiers of the devices 203, 803, 813 may be stored at the remote device 240 in association with a respective encryption key and/or respective watermark data such that encrypted and/or watermarked processed sensor data may be decrypted and/or associated with a particular entity.

It should be recognized that features and aspects of the various examples provided above may be combined into further examples that also fall within the scope of the present disclosure.

The invention claimed is:

1. A module comprising:
a radio to communicate with a sensor;
a communication interface to communicate with a second module;
a chassis to mate with the second module;
a processor connected to the radio, the communication interface, and a memory, the processor to execute instructions stored in the memory, the instructions to:
receive, via the radio, sensor data from the sensor;
process the sensor data to generate processed sensor data; and
communicate, via the communication interface, with processing resources of the second module to share the processing resources of the second module to at least partially process the sensor data at the second module to generate the processed sensor data;
transmit the processed sensor data to a remote device.

2. The module of claim 1, further comprising a network interface for communicating with the remote device, wherein the instructions are further to: transmit, via the network interface, the processed sensor data to the remote device.

3. The module of claim 1, wherein the instructions are further to transmit the processed sensor data to the remote device by: communicating, via the communication interface, the processed sensor data to the second module for transmission to the remote device using a respective network interface of the second module.

4. The module of claim 1, wherein the chassis is to mate with the second module in a stack.

5. A non-transitory machine-readable storage medium encoded with instructions executable by a processor of a module, the instructions to:
receive sensor data from a sensor;
cause the module to communicate, using a communication interface, with a computing device;
process the sensor data to generate processed sensor data at the module and the computing device wherein processing of the sensor data is shared between a first processor of the module and a second processor of the computing device; and
transmit the processed sensor data to a remote device.

6. The non-transitory machine-readable storage medium of claim 5, further comprising instructions to: watermark the processed sensor data prior to transmission to the remote device.

7. The non-transitory machine-readable storage medium of claim 5, further comprising instructions to: encrypt the processed sensor data prior to transmission to the remote device.

8. The non-transitory machine-readable storage medium of claim 5, further comprising instructions to: receive second sensor data from a second sensor; and generate the processed sensor data from the sensor data and the second sensor data.

9. The non-transitory machine-readable storage medium of claim 5, further comprising instructions to: receive second sensor data from a second sensor at the computing device; and generate the processed sensor data from the sensor data and the second sensor data.

10. A device comprising:
a first module and a second module,
the first module comprising: a radio to communicate with a first sensor; a first communication interface to communicate with the second module; a first chassis to mate with the second module; a first processor connected to the radio, the first communication interface, and a first memory, the first processor to execute first instructions stored in the first memory, the first instructions to: receive, via the radio, first sensor data from the first sensor;
the second module comprising: a second sensor; a second communication interface to communicate with the first module; a second chassis to mate with the first chassis of the first module; a second processor connected to the second sensor, the second communication interface, and a second memory, the second processor to execute second instructions stored in the second memory, the second instructions to: receive second sensor data from the second sensor; and
the first instructions and the second instructions further to: cause the first processor and the second processor to share respective processing resources using the first communication interface and the second communication interface; process the first sensor data and the second sensor data to generate processed sensor data; and transmit the processed sensor data to a remote device.

11. The device of claim 10, wherein the first instructions and the second instructions are further to: determine which of the first processor and the second processor to use to generate the processed sensor data based on respective processing speed of the first processor and the second processor.

12. The device of claim 10, wherein the first instructions and the second instructions are further to: determine which of the first processor and the second processor to use to generate the processed sensor data based on respective heat generation of the first processor and the second processor.

13. The device of claim 10, wherein the first instructions and the second instructions are further to: transmit the processed sensor data to the remote device using a first network interface of the first module or a second network interface of the second module.

14. The device of claim 10, wherein the first module and the second module mate in a stack.

* * * * *